United States Patent
Nickel et al.

(10) Patent No.: US 6,705,738 B2
(45) Date of Patent: Mar. 16, 2004

(54) MOTOR VEHICLE EXTERIOR REARVIEW MIRROR ASSEMBLY AND METHOD OF MAKING SAME

(75) Inventors: Volker Nickel, Voehringen (DE);
Alfred Schwarz, Ammerbuch (DE);
Robert Schwed, Bad Teinach-Zavel (DE)

(73) Assignee: DaimlerChrysler AG, Stuttgart (DE)

( * ) Notice: Subject to any disclaimer, the term of this patent is extended or adjusted under 35 U.S.C. 154(b) by 102 days.

(21) Appl. No.: 10/056,059

(22) Filed: Jan. 28, 2002

(65) Prior Publication Data

US 2002/0145816 A1 Oct. 10, 2002

(30) Foreign Application Priority Data

Jan. 26, 2001 (DE) .......................... 101 03 402

(51) Int. Cl.[7] ............................... G02B 7/182
(52) U.S. Cl. ................ 359/871; 359/872; 359/873; 359/875
(58) Field of Search .................. 359/871, 872, 359/873, 875, 841; 248/475.1, 476, 478, 479, 477, 480, 483, 490

(56) References Cited

U.S. PATENT DOCUMENTS

| | | | |
|---|---|---|---|
| 4,679,758 A | * | 7/1987 | Boddy et al. ............... 248/479 |
| 4,951,912 A | * | 8/1990 | Manzoni ................... 248/475.1 |
| 4,957,265 A | * | 9/1990 | Seitz ........................... 248/549 |
| 4,998,814 A | * | 3/1991 | Perry .......................... 359/871 |
| 5,327,294 A | * | 7/1994 | Koske et al. ............... 359/872 |
| 5,959,790 A | * | 9/1999 | Hempelmann .............. 359/841 |
| 5,993,017 A | * | 11/1999 | Romas ........................ 359/871 |
| 6,220,716 B1 | * | 4/2001 | Asaka ......................... 359/871 |

FOREIGN PATENT DOCUMENTS

| | | |
|---|---|---|
| DE | 9310678 | 10/1993 |
| JP | 59120541 | 7/1984 |

* cited by examiner

*Primary Examiner*—Mohammad Sikder
(74) *Attorney, Agent, or Firm*—Crowell & Moring LLP

(57) ABSTRACT

An exterior rearview mirror of a passenger motor vehicle has a retaining foot which can be fastened to a vehicle body in the region of a mirror triangle by fastening means. In order to simplify the installation and removal of an exterior rearview mirror of this type, the fastening means have at least one retaining bracket which is arranged on the retaining foot and is configured in such a manner that it can be hooked in gripping from behind at an edge of an opening formed in the vehicle body in the region of the mirror triangle. The fastening means have at least one latch which is arranged on the retaining foot and is mounted on the retaining foot in a manner such that it can be adjusted between an unblocking position, in which the latch, with the retaining bracket hooked in at the edge, unblocks the edge, and a locking position, in which the latch, with the retaining bracket hooked in at the edge, grips behind the edge.

18 Claims, 2 Drawing Sheets

MOTOR VEHICLE EXTERIOR REARVIEW MIRROR ASSEMBLY AND METHOD OF MAKING SAME

BACKGROUND AND SUMMARY OF THE INVENTION

This application claims the priority of 10103402.4, filed Jan. 26, 2001, the disclosure of which is expressly incorporated by reference herein.

The invention relates to an exterior rearview mirror of a motor vehicle, in particular of a passenger vehicle, having a retaining foot which can be fastened to a vehicle body in the region of a mirror triangle by fastening means.

In the case of conventional exterior rearview mirrors, these fastening means comprise, for example, screw connections which are noted for their great strength. One of their drawbacks is that the installation is relatively time-intensive. Moreover, the quality of the openings on the vehicle body for the screw connections fluctuates, with the result that costly refinishing work may have to be undertaken here.

As an alternative to screw connections, clip connections are known which can be used to carry out the installation of the exterior rearview mirror in a considerably more rapid manner. However, clip connections have the drawback of generally being less strong than screw connections, with the result that the exterior rearview mirror may become detached from the vehicle body during a collision with an obstacle. It is relatively easy for this to result in damage to the exterior rearview mirror, to the vehicle body and to the fastening means. Furthermore, as a rule, clip connections can be detached without being destroyed only with considerable complexity, which makes intended removal of the exterior rearview mirror, for example for repair or maintenance, more difficult.

The present invention is concerned with the problem of finding, for an exterior rearview mirror of the type mentioned at the beginning, an option which ensures simple installation and/or removal of the exterior rearview mirror.

This problem is solved, according to preferred embodiments of the invention, by an exterior rearview mirror of a passenger motor vehicle, having a retaining foot which can be fastened to a vehicle body in the region of a mirror triangle by fastening means wherein the fastening means have at least one retaining bracket which is arranged on the retaining foot and is configured in such a manner that it can be hooked in gripping from behind at an edge of an opening formed in the vehicle body in the region of the mirror triangle, and wherein the fastening means have at least one latch which is arranged on the retaining foot and is mounted on the retaining foot in a manner such that it can be adjusted between an unblocking position, in which the latch, with the retaining bracket hooked in at the edge, unblocks the edge, and a locking position, in which the latch, with the retaining bracket hooked in at the edge, grips behind the edge.

The invention is based on the general concept of fastening the retaining foot to the vehicle body firstly by means of a retaining bracket, which interacts in a form-fitting manner with an edge of an opening formed in the vehicle body, and secondly with a latch, which likewise interacts in a form-fitting manner with this edge. Since the retaining bracket can be hooked in at the edge in a form-fitting manner and since the latch can be adjusted between an unblocking position, in which it unblocks the edge, and a locking position, in which it grips behind the edge in a form-fitting manner, a screwless rapid fastening can be realized for the exterior rearview mirror, said rapid fastening having great strength on account of the form-fitting engagement which is obtained, and therefore ensuring secure fastening of the exterior rearview mirror. Since it is merely necessary to adjust the latch between its unblocking position and its locking position, the installation and the removal can be carried out simply and rapidly.

In a preferred embodiment, actuating means can be arranged on the retaining foot, on a side facing away from the latch, which actuating means are drive-coupled to the latch and can be used to adjust the latch between its unblocking position and its locking position. The actuation of the latch can therefore be undertaken from the outside of the vehicle body. For example, an exterior rearview mirror housing containing a mirror glass is folded back in a suitable manner for this purpose. By means of this measure, the actuation of the latch is therefore simplified, as a result of which the installation or removal is simplified at the same time.

Of particular advantage is an embodiment in which a convexity projecting into the interior of the vehicle body is formed on the edge, at least in a section assigned to the retaining bracket and/or the latch, and at said convexity the retaining bracket hooks in gripping behind it, and/or the latch, in its locking position, grips behind it. By means of this measure, when the retaining bracket is hooked in or when the latch is adjusted into its locking position, a secure fastening between the edge and the retaining foot can be achieved. This leads to compensation of play and to a suppression of relative movements between the edge and retaining foot during operation of the vehicle.

This secure fastening can additionally be supported by a run-on edge being formed on a free end of the retaining bracket and/or on an end of the latch which grips behind the edge in the locking position and, as the retaining bracket is being hooked in or as the latch is being adjusted into its locking position, said run-on edge pushes the free end of the retaining bracket or the latch end away from the retaining foot. So that the fastening means do not become damaged in this process, the retaining bracket and/or the latch or the latch mounting are in this respect of resilient and flexible design.

Furthermore, the convexity formed on the edge can advantageously be used in order to secure the mirror fastening by a snap-in lug being formed on the retaining bracket, which snap-in lug, when the retaining bracket is hooked in at the edge, snaps in place gripping behind the convexity. As an alternative or in addition, it is also possible for a snap-in lug to be formed on the latch, which snap-in lug, in the locking position of the latch, can snap into place on the convexity gripping behind said convexity. This prevents the retaining bracket and the latch from automatically being adjusted from their hook-in position and locking position, respectively.

In a preferred embodiment, a groove can be formed in the edge region, on a side facing the retaining foot, which groove encircles the opening in a closed manner and in which a seal which is complementary therewith and is arranged on the retaining foot fits when the exterior rearview mirror is fitted. By this means, the connection between the exterior rearview mirror and vehicle body is sealed so as to prevent an ingress of impurities, in particular rain water or spray water, into the interior of the vehicle body and into the interior of the exterior rearview mirror.

This groove is expediently formed by deforming the edge in such a manner that an outer side of the edge region has a concave configuration and forms the groove, while an inner side of the edge has a convex configuration and forms the abovementioned convexity.

In accordance with a particularly advantageous embodiment, the retaining bracket and/or latch can be designed in such a manner that the seal fits under prestress in the groove when the exterior rearview mirror is fitted. The sealing action can therefore be considerably improved.

The problem on which the invention is based is also solved by methods of fastening and unfastening the mirror to a vehicle exterior body part. In accordance with these methods, the exterior rearview mirror can be fitted and removed rapidly and with simple actions.

Further important features and advantages of the invention emerge from the claims, from the drawings and from the associated description of the figures with reference to the drawings.

The features which are mentioned above and those which have yet to be explained below can be used not only in the combination given in each case, but also in other combinations or on their own without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
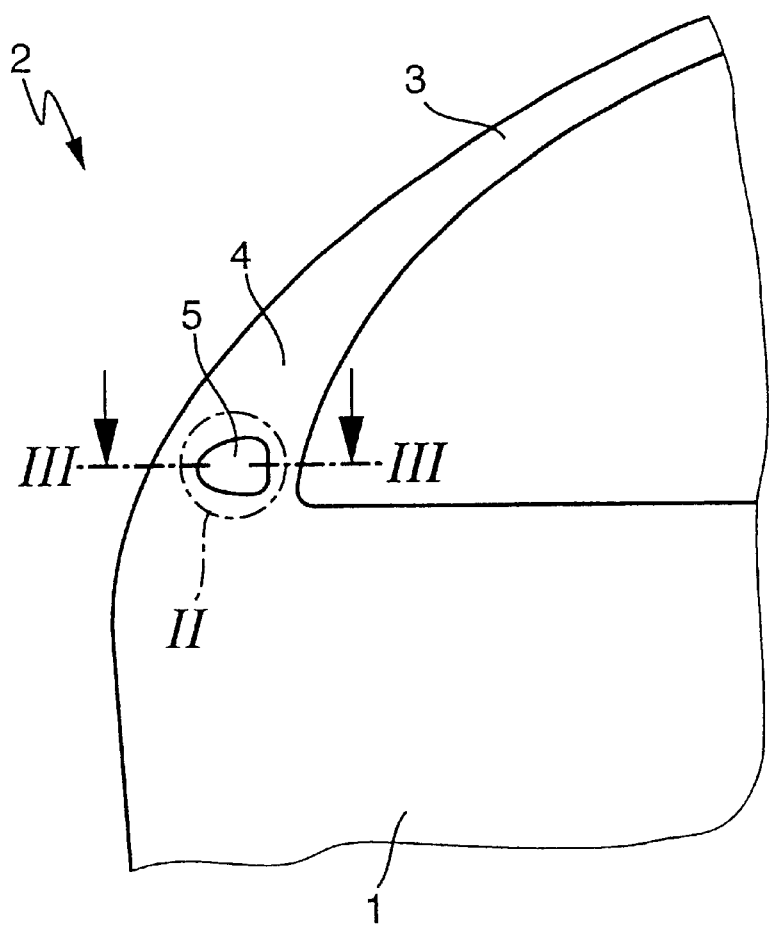
FIG. 1 is a schematic side view of a region of a motor vehicle in which an exterior rearview mirror according to the invention is arranged.
Figure 2:
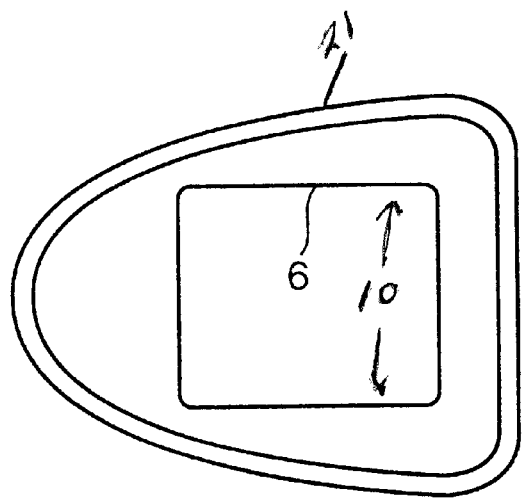
FIG. 2 is an enlarged schematic illustration of a region denoted by II in FIG. 1, in a special embodiment.
Figure 3:
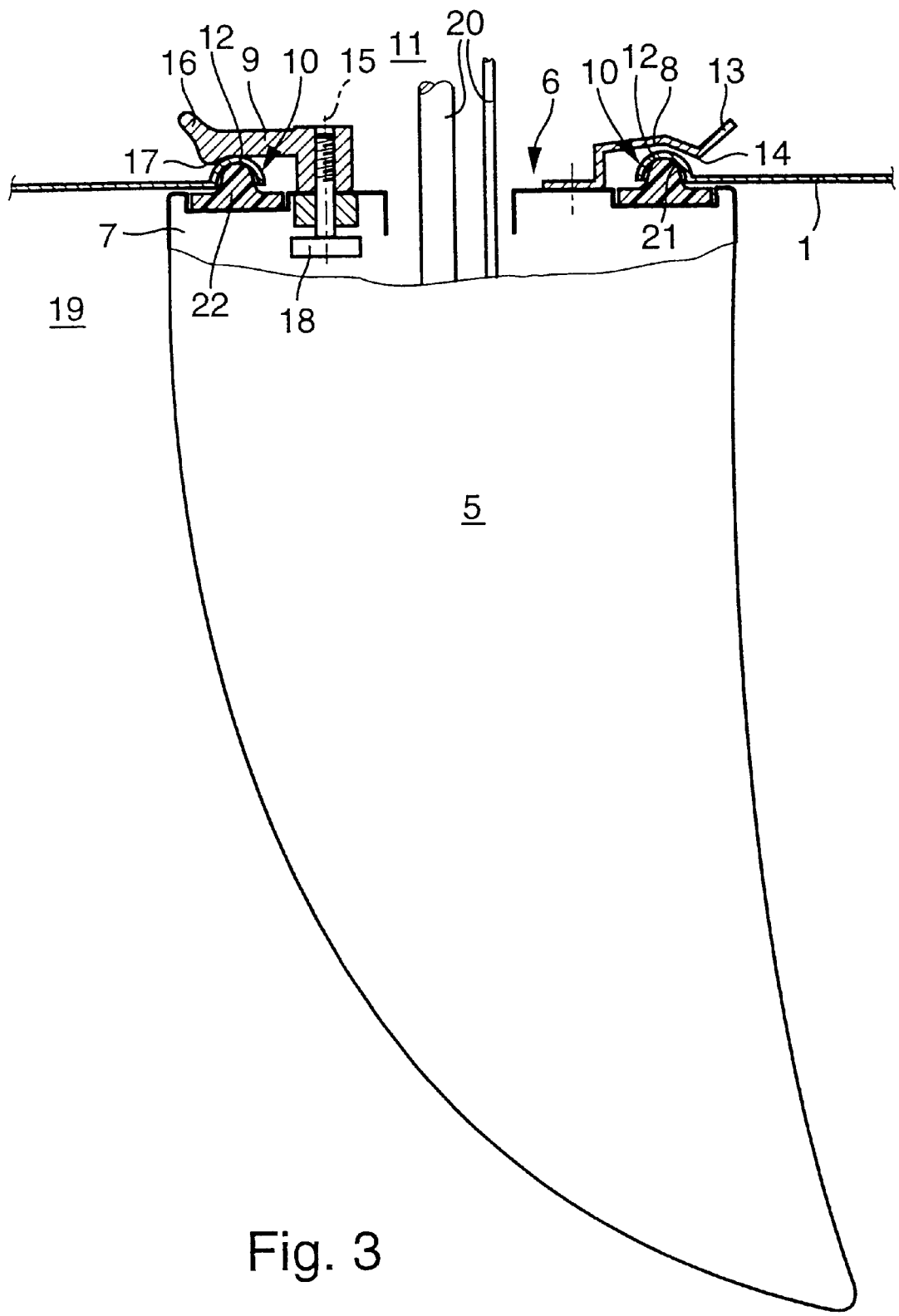
FIG. 3 is a sectional illustration taken along section lines III in FIG. 1, shown on an enlarged scale.

FIG. 1 shows the front part of a front vehicle door 1 of a motor vehicle 2 (otherwise not illustrated) which is preferably designed as a passenger vehicle. Formed on the door 1 at the lower end of an A-pillar 3 is a "mirror triangle" 4, i.e. the location at which an exterior rearview mirror 5 is customarily fastened to the vehicle body, i.e. here to the vehicle door 1. In the case of a modern passenger vehicle 2, an exterior rearview mirror 5 of this type is provided with a multiplicity of functions and contains, for example, a mirror heating system and a mirror adjusting device. In order to actuate these functions, the individual components of the exterior rearview mirror 5 have to be connected to the electric system of the vehicle 2. This expediently takes place through an opening which is formed in the vehicle body 1 and is concealed in FIG. 1 by the fitted exterior rearview mirror 5. In FIGS. 2 and 3, this opening is denoted by 6.

According to FIG. 3, the exterior rearview mirror 5, in a section provided for fastening it to the vehicle body 1, is formed as a retaining foot 7 on which fastening means 8, 9 are formed which can be used to fasten the retaining foot 7 and therefore the exterior rearview mirror 5 to the vehicle body 1. These fastening means have a retaining bracket 8 and a latch 9 which, when the exterior rearview mirror 5 is fastened, each interact with an edge 10 of the opening 6. In the embodiment according to FIG. 3, this edge 10 has a convexity 12 projecting into an interior 11 of the vehicle body 1. This convexity 12 can be designed such that it is closed on its periphery; it is possible as well to form the convexity 12 merely in some sections on the edge 10, mainly in a section of the edge 10 which is assigned to the retaining bracket 8 and/or to the latch 9.

When the exterior rearview mirror 5 is fitted, the retaining bracket 8 hooks in at the edge 10, the retaining bracket 8 gripping behind or over the edge 10 in a form-fitting manner. At a free end 13 of the retaining bracket 8, the latter is designed as a run-on edge which, on the one hand, simplifies the plugging of the retaining bracket 8 onto the convexity 12. On the other hand, the end 13 which is designed as a run-on edge also causes, as the retaining bracket 8 is being hooked in at the edge 10, the retaining bracket 8 or the free end 13 thereof to be pushed towards the interior 11 of the vehicle body 1. Since the retaining bracket 8 is of resilient and flexible design, when the exterior rearview mirror 5 is fitted the retaining bracket 8 bears under prestress against the edge 10. This enables installation and manufacturing tolerances and also play to be compensated for; in addition, relative movements between the exterior rearview mirror 5 and vehicle body 1 can thereby be suppressed. In the case of the preferred embodiment according to FIG. 3, a snap-in lug 14 which interacts with the convexity 12 is also formed on the retaining bracket 8. This snap-in lug 14 of the retaining bracket 8 snaps into place, when the retaining bracket 8 is hooked in at the edge 10, and in the process grips behind the convexity 12. The retaining bracket 8 which is hooked in at the edge 10 is thereby effectively secured against being spontaneously detached.

The latch 9 is mounted on the retaining foot 7 in a manner such that it can be adjusted between a locking position, which is shown in FIG. 3, and an unblocking position. The latch 9 is preferably mounted on the retaining foot 7 in a manner such that it can pivot in a rotating manner, this mounting having an axis of rotation 15 which is perpendicular with respect to the plane of the opening 6. An embodiment is also possible in which the latch 9 is mounted on the retaining foot 7 in a manner such that it can be displaced bidirectionally essentially parallel to the plane of the opening 6.

In the locking position which is shown in FIG. 3, the latch 9 grips behind the edge 10 and thereby produces a form-fitting connection which ensures a secure fastening of the exterior rearview mirror 5 to the vehicle body 1. The unlocking position is reached, for example by rotation of the latch 9 through approximately 90° about its axis of rotation 15. In this unblocking position, the latch 9 unblocks the edge 10, i.e. the latch 9 can then pass through the opening 6 past the edge 10.

In the embodiment shown here, a latch end 16 which grips behind the edge 10 in the locking position according to FIG. 3 is likewise designed as a run-on edge which, when the latch 9 is adjusted into its locking position, causes the latch end 16 to be pushed away from the retaining foot 7. The latch 9 is of resilient and flexible design or is mounted in a resilient and flexible manner the retaining foot 7. This measure is also intended to produce a prestress which presses the retaining foot 7 against the vehicle body 1.

The latch 9 is provided with a snap-in lug 17 which, in the locking position according to FIG. 3, grips behind the convexity 12. This has the consequence that the latch 9, as soon as it has reached its locking position, is secured in this position and can no longer be automatically adjusted.

Actuating means 18 which are drive-coupled to the latch 9 are also arranged on the retaining foot 7. A rotational actuation of the actuating means 18 likewise accordingly leads to a rotational actuation of the latch 9. The arrangement of the actuating means 18 on a side of the retaining foot 7 facing away from the latch 9 is of particular importance here. This enables the latch to be actuated from an outer side 19 of the vehicle body 1 via the actuating means 18. This substantially simplifies the prospect of fitting or removing the exterior rearview mirror 5. The actuating means 18 can be designed, for example, in such a manner that they can be actuated using a conventional tool. An embodiment is also possible in which a special tool is required for actuating the actuating means 18.

FIG. 3 also shows the manner in which cables or lines 20 run from the interior 11 of the vehicle body 1 to the interior of the exterior rearview mirror 5 through the opening 6 and through the retaining foot 7. These cables or lines 20 serve for the actuation and current supply of setting elements and other elements of the exterior rearview mirror 5.

A groove 21 which completely surrounds the opening 6 is formed in the region of the edge 10, on a side of the vehicle body 1 which faces the exterior rearview mirror 5. In the embodiment according to FIG. 3, the edge 10 is configured in such a manner that the groove 21 is formed on the one side and the convexity 12 is formed on the other side. The cross section surrounded by the groove 21 then corresponds substantially to the cross section of the opening 6. In contrast thereto, in the embodiment according to FIG. 2, the groove 21 surrounds a larger cross section than the opening 6, which, in principle, can also have a different geometry than the groove 21. According to FIG. 2, the edge 10 therefore runs within a cross section surrounded by the groove 21. In addition, it is possible for the edge 10 to be arranged offset with respect to the interior 11 of the vehicle body 1 relative to the groove 21.

According to FIG. 3, a sealing element 22 which is closed on its periphery is fitted on the foot 7 and is formed on a side facing the vehicle body 1 in a manner complementary with the groove 21. When the exterior rearview mirror 5 is fitted, the seal 22 therefore penetrates into the groove 21 and comes to rest therein or against its walls in a sealing manner. The dimensioning of the seal 22 is preferably coordinated with the dimensions of the retaining bracket 8 and latch 9 in such a manner that when the retaining bracket 8 and latch 9 have snapped into place on the convexity 12 there is a prestress between the fastening means 8, 9 and the retaining foot 7, which prestress brings the seal 22 to bear under prestress in a sealing manner in the groove 21. By means of this measure, the sealing action of the seal 22 is firstly reinforced. Secondly, relative movements between the exterior rearview mirror 5 and vehicle body 1 are reduced.

The form-fitting engagement of the seal 22 in the groove 21 also has the effect of preventing relative movements of the retaining foot 7 parallel to the vehicle body 1.

The latch 9 is arranged on the retaining foot 7 expediently lying approximately opposite the retaining bracket 8, as a result of which a distribution of the retaining forces along the edge 10 is obtained.

The installation of the exterior rearview mirror 5 takes place, for example, as follows:

The exterior rearview mirror 5 is positioned with its retaining foot 7 at an inclination on the opening 6 in order thereby to hook the retaining bracket 8 in at the edge 10. The snapping into place of the snap-in lug 14 of the retaining bracket 8 on the convexity 12 brings about the formation, in the region of the retaining bracket 8, of a pivot axis which runs perpendicular with respect to the plane of projection in FIG. 3. When the retaining bracket 8 has snapped into place, the retaining foot 7 can then be pivoted about this pivot axis until the retaining foot 7 comes to bear completely against the edge 10. In the process, the latch 9, which is in an unblocking position, is passed through the opening 6. Subsequently, corresponding actuation of the actuating means 18 enables the latch 9 to pivot out of the unblocking position into its locking position. After the snap-in lug 17 of the latch 9 has snapped into place on the convexity 12, the installation of the exterior rearview mirror 5 is essentially finished and the exterior rearview mirror 5 is fastened securely to the vehicle body 1.

The removal of the exterior rearview mirror 5 takes place in a corresponding, reverse sequence of the installation steps:

first of all, the latch 9 is adjusted into its unblocking position; subsequently, the retaining foot 7 can be pivoted about the pivot axis formed in the region of the retaining bracket 8, in which case the latch 9 is guided out of the interior 11 through the opening 6; finally, the retaining bracket 8 is unhooked from the edge 10.

It is apparent that the corresponding lines and cables 20 have to be connected to their corresponding interfaces prior to the installation of the exterior rearview mirror 5. The corresponding is applicable for the removal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Exterior rearview mirror of a passenger motor vehicle, having a retaining foot which can be fastened to a vehicle body in a region of a mirror triangle by fastening means, wherein the fastening means have at least one retaining bracket which is directly attached to the retaining foot and arranged to be hooked in gripping from behind at an edge of an opening formed in the vehicle body in the region of the mirror triangle, and wherein the fastening means have at least one latch which is directly attached to the retaining foot and arranged to be adjusted between an unblocking position, in which the latch, with the retaining bracket hooked in at the edge, unblocks the edge, and a locking position, in which the latch, with the retaining bracket hooked in at the edge, grips behind the edge.

2. Exterior rearview mirror according to claim 1, wherein the latch is mounted on the retaining foot in a manner such that it can be displaced in one of a bidirectionally manner and a rotating manner.

3. Exterior rearview mirror according to claim 1, wherein actuating means are arranged on the retaining foot on a side facing away from the latch, which actuating means are drive-coupled to the latch and can be used to adjust the latch between its unblocking position and its locking position.

4. Exterior rearview mirror according to claim 2, wherein actuating means are arranged on the retaining foot on a side facing away from the latch, which actuating means are drive-coupled to the latch and can be used to adjust the latch between its unblocking position and its locking position.

5. Exterior rearview mirror according to claim 1, wherein a convexity projecting into the interior of the vehicle body is formed on the edge at least in a section assigned to one of the retaining bracket and the latch, and at said convexity of the retaining bracket and latch engages behind the convexity.

6. Exterior rearview mirror according to claim 1 wherein, a run-on edge is formed on a free end of the retaining bracket and, as the retaining bracket is being hooked in at the edge, said run-on edge pushes the free end of the retaining bracket away from the retaining foot, the retaining bracket being of resilient and flexible design.

7. Exterior rearview mirror at least according to claim 5, wherein a snap-in lug is formed on the retaining bracket and, when the retaining bracket is hooked in at the edge, said snap-in lug snaps in place gripping behind the convexity.

8. Exterior rearview mirror according to claim 1, wherein a run-on edge is formed on an end of the latch which grips behind the edge in the locking position and, as the latch is being adjusted into its locking position, said run-on edge pushes the latch end away from the retaining foot, the latch being of resilient and flexible design and/or being mounted in a resilient and flexible manner on the retaining foot.

9. Exterior rearview mirror at least according to claim 8, wherein a snap-in lug is formed on the retaining bracket and, when the retaining bracket is hooked in at the edge, said snap-in lug snaps in place gripping behind the convexity.

10. Exterior rearview mirror according to claim 5, wherein a snap-in lug is formed on the latch and, in the locking position of the latch, is snapped into place on the convexity gripping behind the convexity.

11. Exterior rearview mirror according to claim 1, wherein a groove is formed in the region of the edge, on a side facing the retaining foot, which groove surrounds the opening and in which a seal which is complementary therewith and is arranged on the retaining foot fits when the exterior rearview mirror is fitted.

12. Exterior rearview mirror according to claim 11, wherein at least one of the retaining bracket and latch are designed in such a manner that the seal fits under prestress in the groove when the exterior rearview mirror is fitted.

13. Exterior rearview mirror according to claim 4, wherein a groove is formed in the region of the edge, on a side facing the retaining foot, which groove surrounds the opening and in which a seal which is complementary therewith and is arranged on the retaining foot fits when the exterior rearview mirror is fitted.

14. Exterior rearview mirror according to claim 13, wherein at least one of the retaining bracket and latch are designed in such a manner that the seal fits under prestress in the groove when the exterior rearview mirror is fitted.

15. Exterior rearview mirror according to claim 1, wherein the latch is arranged on the retaining foot essentially lying opposite the retaining bracket.

16. Exterior rearview mirror according to claim 4, wherein the latch is arranged on the retaining foot essentially lying opposite the retaining bracket.

17. Exterior rearview mirror according to claim 6, wherein the latch is arranged on the retaining foot essentially lying opposite the retaining bracket.

18. Exterior rearview mirror according to claim 11, wherein the latch is arranged on the retaining foot essentially lying opposite the retaining bracket.

* * * * *